P. P. CATALANO.
AUTOMATIC SAFETY GAS CUT-OFF.
APPLICATION FILED MAR. 30, 1921.

1,416,169.

Patented May 16, 1922.

Inventor
P. P. Catalano.

By
Lacey & Lacey, Attorneys

UNITED STATES PATENT OFFICE.

PETER PANEPINTO CATALANO, OF NORTH COLLINS, NEW YORK.

AUTOMATIC SAFETY GAS CUT-OFF.

1,416,169.  Specification of Letters Patent.  Patented May 16, 1922.

Application filed March 30, 1921. Serial No. 456,926.

*To all whom it may concern:*

Be it known that I, PETER P. CATALANO, a citizen of the United States, residing at North Collins, in the county of Erie and State of New York, have invented certain new and useful Improvements in Automatic Safety Gas Cut-Offs, of which the following is a specification.

This invention relates to a safety gas cut-off for use in gas systems where the pressure, at times, becomes abnormally low with the result that the flame goes out and later, when the pressure increases, the gas escapes with obvious danger to human life.

In the present invention one of the objects is to provide a device of this character which is so constructed that an increase in pressure of the gas, after the gas pressure has once diminished, positively shuts off the gas flow until a manual release device has been operated to permit the flow to continue.

Another feature of the invention resides in the provision of a device of this character which is gravity actuated for shut-off.

A further feature resides in the use of a ball valve in this class of device which cooperates with a second ball which forms a stop means to permit the flow of gas through the device until the second ball falls away from the first.

Figure 1:
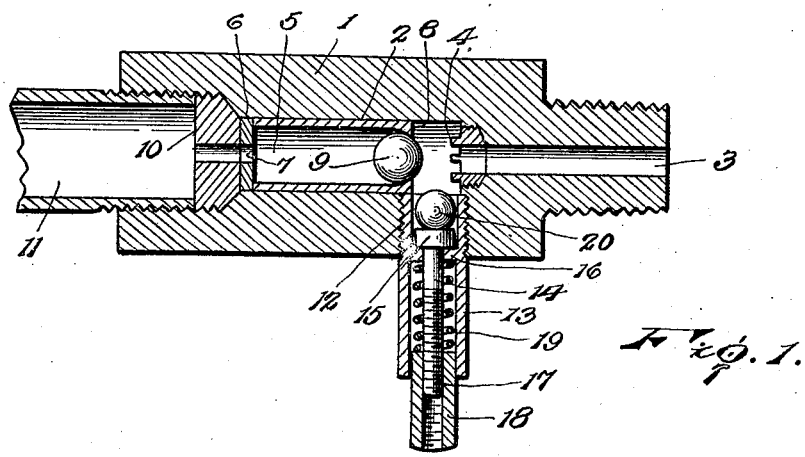
Figure 1 is a vertical longitudinal section through a device constructed in accordance with the present invention.

In detail:

The invention, as herein shown for the purpose of illustrating the invention, comprises a casing 1 having the horizontal passage 2 connecting with a concentric passage 3 of smaller diameter than the passage 2 and having lugs 4 at its inner end for a purpose to be hereinafter described. The inlet end of the passage 2 receives a thimble 5 which has seated thereon a disk 6 provided with a small hole 7 to admit the gas, while the other end of the thimble is formed as at 8 to provide a valve seat for a ball 9 retained within the thimble. A cap plug 10 seats against the end of the disk 6 and prevents the same from coming out and the end of the gas supply pipe 11 screws against this cap plug.

At right angles to the passage 2 is a threaded opening 12 which receives the plunger casing 13 which carries a plunger 14 having a head 15 seating on the partition 16, the stem 17 of said plunger being threaded to receive a plunger knob 18 which serves to confine the spring 19 so that the plunger head 15 will normally be in the position shown in Figure 1. Lying within the end of the plunger casing 13 and resting upon the top of the plunger head 15 is a ball 20.

Figure 2:
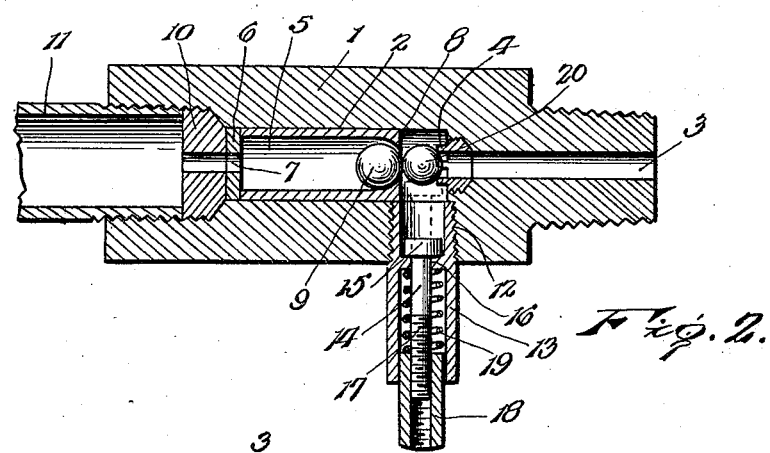
Figure 2 is a similar view with the valve open.

The operation of the device as shown in Figures 1 and 2 is as follows:

Gas, entering at 11, when the ball 20 is in the position shown in Figure 1, moves the ball 9 to its seat 8 with the result that gas cannot pass thereby. However, suppose that it is desired to have gas pass to the outlet 3, the plunger knob 18 is pressed which carries the ball 20 to the position shown in Figure 2 wherein it rests on the lugs 4 and pushes the ball 9 from its seat slightly with the result that gas flows through the outlet 3.

If the pressure of gas should now fall below normal the result would be that the pressure on the ball 9 would be relieved allowing the ball 20 to drop down onto the plunger head 15 so that the next time the gas came on at its full pressure the ball 9 would move to the position shown in Figure 1. In this way the gas would be prevented from escaping and the supply would be closed until such time as the operator pressed the plunger knob 18.

Figure 3:
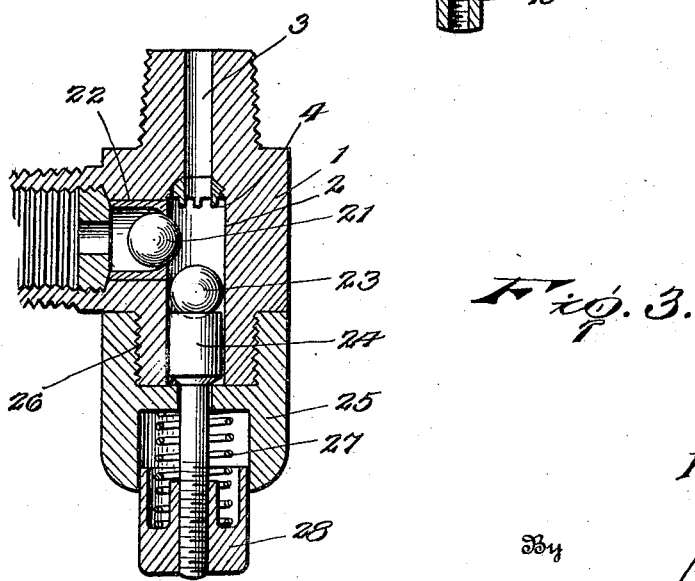
Figure 3 is a modified form of the device.

In the form of the device shown in Figure 3, and which operates on exactly the same principle as that just previously described, the inlet and outlet passages are at right angles to each other. The ball 21 operates in a seat thimble 22 and is held off its seat by a ball 23 operated by the plunger 24 which is carried by a plunger casing 25 threaded onto the valve casing, as at 26. A spring 27 resting against the plunger casing and a button 28 serves to normally maintain the ball in the position shown in Figure 2.

It is to be particularly noted that the construction of the plunger 16 and its casing as shown in Figures 1 and 2, and the plunger 24 and its casing, as shown in Figure 3, are arranged to form a valve so that no gas can escape around the plunger in either case.

While, in the foregoing, I have shown specific embodiments of the invention, it is nevertheless to be understood that in carrying the same into practice I may resort to such modifications as fall within the scope of the appended claims.

I claim:

1. In a gas cut-off, the combination of a casing having an inlet passage and an outlet passage and provided with a valve seat in the inlet passage, a valve disposed within the inlet passage and held to its seat by the direct pressure of gas in the inlet passage, and an unseating device within the casing normally lying between the valve and the outlet passage and holding the valve unseated, said device being maintained in normal operative position by frictional engagement with the valve and with an interior wall of the casing under pressure of the gas upon the valve.

2. In a gas cut-off, the combination of a casing having an inlet passage and an outlet passage and provided with a valve seat across the inlet passage, a freely movable valve mounted in the inlet passage and held to its seat by direct pressure of gas in the inlet passage, an unseating device normally interposed between the valve and the outlet passage and in contact with the valve and a diametrically opposite point of the casing whereby to hold the valve off the seat, said device being movable by gravity from contact with the valve upon reduction of pressure on the valve, and means for resetting the said device.

3. In a gas cut-off, the combination of a casing having an inlet passage and an outlet passage, a thimble secured in the inlet passage and having its inner end formed into a valve seat, a freely movable valve mounted within said thimble and held to the seat by direct pressure of gas entering the casing, the valve projecting through the seat when in closed position, an unseating body mounted in the casing beyond the valve seat and adapted to be held by pressure of gas in contact with the valve and an interior wall of the casing whereby to maintain the valve normally unseated, said body being releasable by gravity from contact with the valve upon reduction of pressure, and a plunger mounted in the side of the casing below the unseating body to lift the same into contact with the valve.

In testimony whereof I affix my signature.

PETER PANEPINTO CATALANO. [L. S.]